(No Model.) 2 Sheets—Sheet 1.
J. W. W. CLARK.
SPIRIT LEVEL AND STRAIGHT EDGE.
No. 393,539. Patented Nov. 27, 1888.
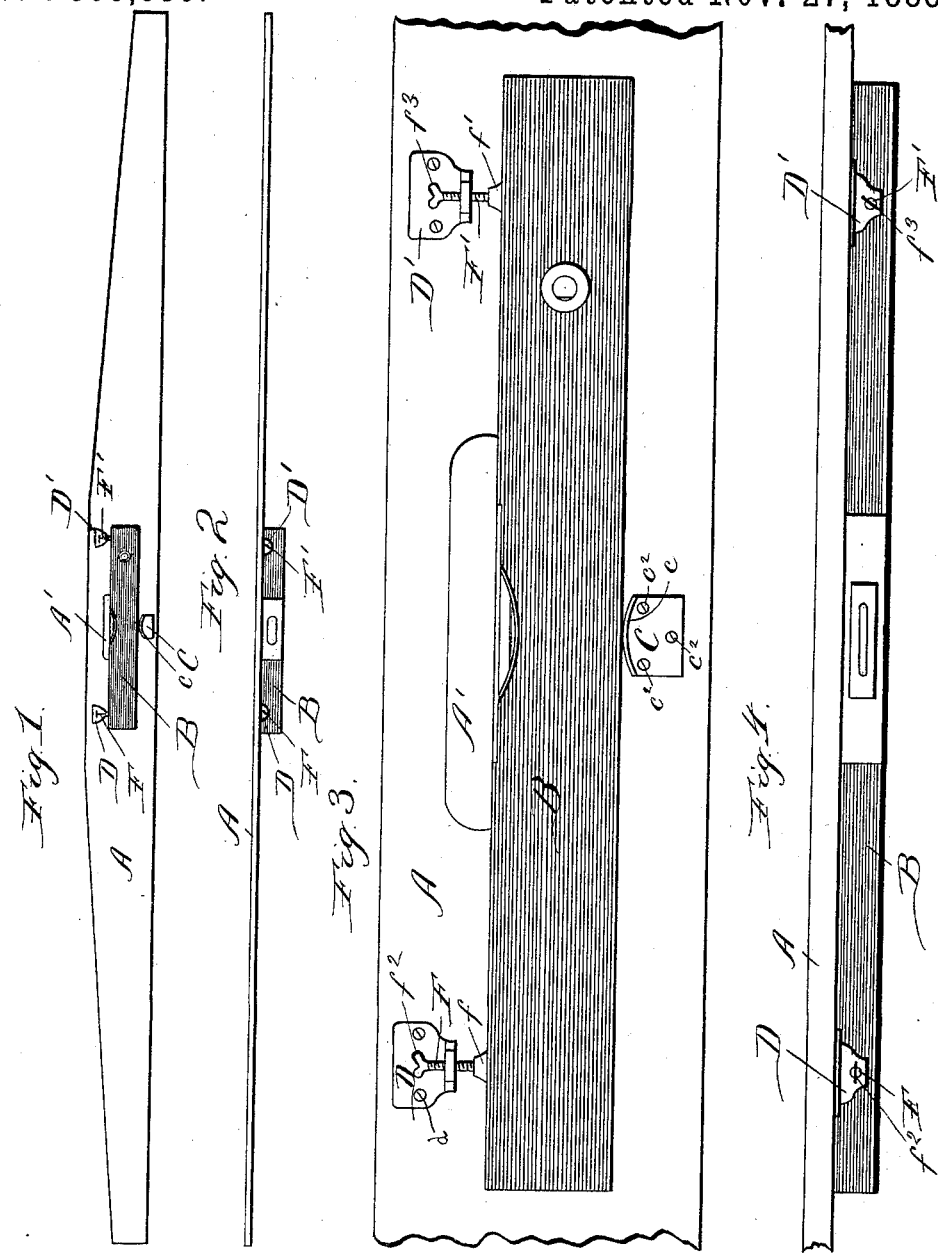
Witnesses:
Geo. E. Curtis
H. W. Munday
Inventor:
John W. W. Clark.
By Munday, Evarts & Adcock
his Attorneys.

(No Model.) 2 Sheets—Sheet 2.

J. W. W. CLARK.
SPIRIT LEVEL AND STRAIGHT EDGE.

No. 393,539. Patented Nov. 27, 1888.

Witnesses:
Sew. C. Curtis.
Mack A. Claflin.

Inventor.
John W. W. Clark.
By Munday, Evarts & Adcock.
his Attorneys.

UNITED STATES PATENT OFFICE.

JOHN W. W. CLARK, OF RIVERSIDE, ILLINOIS.

SPIRIT-LEVEL AND STRAIGHT-EDGE.

SPECIFICATION forming part of Letters Patent No. 393,539, dated November 27, 1888.

Application filed July 30, 1888. Serial No. 281,420. (No model.)

*To all whom it may concern:*

Be it known that I, JOHN W. W. CLARK, a citizen of the United States, residing at Riverside, in the county of Cook and State of Illinois, have invented a new and useful Improvement in Combined Spirit-Level and Straight-Edge, of which the following is a specification.

My invention relates to combined spirit-level and straight-edge for use by carpenters, masons, and others.

The object of my invention is to provide a cheap, simple, and efficient means whereby an ordinary carpenter's spirit-level may be readily and quickly combined with a straight-edge.

My invention consists in the novel devices and novel combinations of parts and devices herein shown and described, and more particularly pointed out in the claims.

Figure 5:
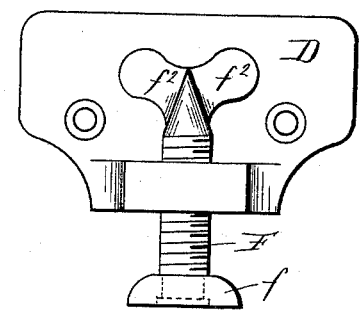
Figure 6:
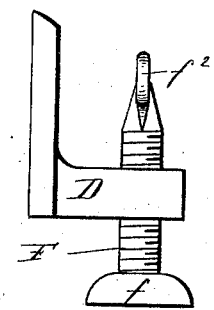
Figure 7:
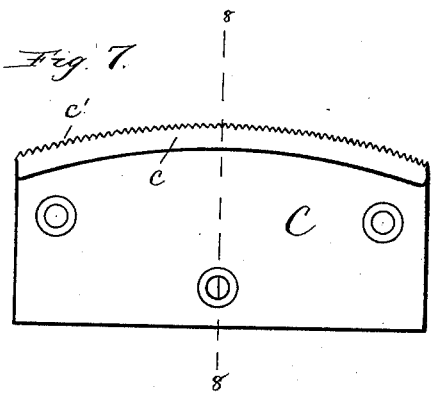
Figure 8:
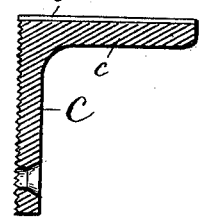

In the accompanying drawings, forming part of the specification, and in which similar letters of reference indicate like parts, Figure 1 is a side view of a device embodying my invention. Fig. 2 is a top or plan view. Fig. 3 is an enlarged side view, showing the level and its means of attachment to the straight-edge. Fig. 4 is a top or plan view of the same. Fig. 5 is a detail front view of one of the clips and its adjusting and clamping screw. Fig. 6 is a side or edge view of the same. Fig. 7 is a detail view of the middle bracket or support upon which the level rests, and Fig. 8 is a section on line S S of Fig. 7. (Figs. 5, 6, 7, and 8 are enlarged.)

In said drawings, A represents a straight-edge, the same being of the ordinary construction. It is preferably or usually made of a light well-seasoned pine board and about sixteen feet in length.

B represents an ordinary spirit-level of any suitable or usual construction.

C is a bracket having a curved projecting lip or flange, $c$, upon which the level B rests. The curvature of the flange $c$ permits the level to rock thereon, as may be necessary to adjust it parallel to the bottom line, $a$, of the straight-edge A. The upper surface of this curved flange $c$ is, or should be, finely corrugated, as indicated at $c'$, to better hold or grip the level B. The supporting-bracket C is secured to the straight-edge A at one side thereof, near the middle, by screws $c^2$.

D D' are right-angle clips or brackets having threaded holes in which the adjusting and clamping screws F F' are mounted. The brackets D D' are attached to the straight-edge A, one near each end of the level and above the same, by screws $d$.

The adjusting-screws F F' are provided with caps or plates $f f'$ at their ends to bear against the upper edge or face of the level B. The screws F F' turn in the caps $f f'$, the caps being secured on the ends of the screws by suitable collars or washers or by upsetting or riveting the ends of the screws. The screws F F' have thumb-pieces or handles $f^2 f^3$ for turning the same. The under face or surface of the caps or socket-pieces $f f'$ may preferably be finely corrugated to give better holding-surface against the level B.

The straight edge A is provided with a handle, grasp-slot, or hole, A', near its middle edge and just above the bubble or middle point of the level, so that the level may be read from either side of the straight-edge A. The slot A' serves both as a handle for the straight-edge and to throw better light upon the reading-point of the level.

The bottom and top faces of the level are clamped between the supporting-bracket C and the screws F F', which are mounted in the upper brackets, D D'. By turning the screws F F', the level may be quickly adjusted to parallelism with the straight-edge. By this means a carpenter or millwright can quickly attach his ordinary spirit-level to his straight-edge. The straight-edge itself is required to be straight only on one edge, $a$. The level, being attached to the straight-edge, is carried about with it as one piece, and does not require to be held on or separately put on every time it is used.

My combined straight-edge and level will work with perfect accuracy, whether the level itself be true or not, as the thumb-screws F F' adjust the bubble of the level to the straight lower edge, $a$, of the straight-edge. In case either the level itself gets out of true or the straight-edge warps or shrinks so as to affect the trueness of the level, it may be quickly and accurately readjusted.

The brackets C, D, and D' are preferably made of cast metal. The inner faces of these brackets, which fit against the straight-edge, should be finely corrugated, as indicated in the drawings, so as to give a better and firmer grip.

I claim—

1. The combination, with straight-edge A, of spirit-level B, supporting-bracket C, having curved flange c, and upper brackets, D D', provided with thumb-screws F F', said brackets being secured to one side of the straight-edge, and the level being clamped between said bracket C and thumb-screws F F', substantially as specified.

2. The combination, with straight-edge A, of level B and brackets C, D, and D', secured to said straight-edge, two of said brackets being furnished with adjustable clamp-screws, said level being clamped between one of said brackets and said clamp-screws, substantially as specified.

3. The combination, with straight-edge A, of level B, brackets C D D', and adjustable clamp-screws F F', furnished with cap-pieces $ff'$, substantially as specified.

4. The combination, with straight-edge A, having handle-hole A', of spirit-level B, bracket C, having curved flange c, and brackets D D', having thumb-screws F F', furnished with caps $ff'$, substantially as specified.

JOHN W. W. CLARK.

Witnesses:
A. H. STONEBRAKER,
WM. HACKMAN.